Nov. 11, 1969  J. R. JONES  3,477,784
RADIOGRAPHIC MICROFILM PROJECTION DEVICE
Filed Dec. 27, 1967  3 Sheets-Sheet 1

INVENTOR
JOSEPH R. JONES
BY
ATTORNEY

Nov. 11, 1969  J. R. JONES  3,477,784
RADIOGRAPHIC MICROFILM PROJECTION DEVICE
Filed Dec. 27, 1967  3 Sheets-Sheet 3

INVENTOR.
JOSEPH R. JONES
BY
Charles B Curry
ATTORNEY

United States Patent Office 3,477,784
Patented Nov. 11, 1969

3,477,784
RADIOGRAPHIC MICROFILM PROJECTION DEVICE
Joseph R. Jones, Concord Mobile Home, Space 5, Galloway Drive, Concord, Calif. 94520
Filed Dec. 27, 1967, Ser. No. 693,980
Int. Cl. G03b 21/28
U.S. Cl. 353—81                                    5 Claims

ABSTRACT OF THE DISCLOSURE

A radiographic microfilm projection device having a precision speed controlled film projector that utilizes rolled film. The rolled film passes through a film guide that accurately positions the film and provides an extremely smooth surface that minimizes film deterioration. A film contaminant remover is provided to remove contaminants from the film as it enters the film guide to prevent film deterioration and to minimize film viewing errors. The projection device provides for viewing on either a base screen or a front screen. Positioned behind the base screen are readily accessible electrical controls including means for compensating for varying microfilm densities. The projection device also includes tinting elements for simulating actual radiographs.

---

The invention described herein may be manufactured and used by or for the Government of the United States of America for governmental purposes without payment of any royalties thereon or therefor.

The present invention relates to a radiographic microfilm projection device and more particularly to a projection technique that is capable of converting radiographic film information contained on microfilm onto a projection screen which accurately simulates the characteristics of the radiographic film.

One of the primary methods of quality control is the use of X-rays to photograph equipment being examined. The films which have been exposed to the X-rays have been generally referred to as radiographs. Radiographs are typically contained on 14 by 17 inch films and eight of such films will weigh approximately one pound. Millions of such radiographic films are stored for future reference, frequently for several years, and it therefore requires considerable storage volume for such retention. In addition, the amount of silver contained in these films is very substantial. For example, five pounds of silver can be obtained by any one of several conventional recovery processes from about 100 pounds of radiographic film. By use of the microfilming technique of the present invention all of the silver may be recovered and a volume of 7 feet by 7 feet by 21 feet of radiographic storage can be reduced to an equivalent total volume of about 15 inches by 25 inches by 8 inches in microfilm storage. Many different attempts have been made to reduce radiographic films to microfilms. However, considerable difficulty has been encountered because radiographic films have variable film densities of from about 1.5 to about 3.5 (dimensionless units) and the conversion of this into meaningful microfilm information has been extremely difficult and has not been heretofore achieved. This is in part due to the fact that to have meaningful information contained on microfilm, which is responsive to ordinary light, there is a requirement that the microfilm have a density range of from about 0.6 to about 0.9 (dimensionless units).

One method for converting radiographic film information onto microfilm is described in co-pending application, Ser. No. 693,394 filed Dec. 26, 1967 by Mr. Joseph R. Jones, which has resulted in a successful means by which meaningful information can be converted from radiographic film onto microfilm. However, even with the information thus contained on the microfilm there is a variation in density of the information on the microfilm and it is therefore necessary to compensate for this variation when viewing this microfilm information on a screen or the like. In addition, those who are accustomed to viewing radiographic films find it desirable and quite important to view microfilm having the same general appearance as radiographic films. Accordingly, it is necessary to actually simulate the environmental conditions of the radiographic film when viewing the microfilm. For convenience and speed of operation it is preferable that the microfilm be placed on rolls.

The object of the present invention is to overcome these aforementioned difficulties by providing radiographic microfilm projector which is very rapid and actually simulates the conditions of radiographic films when viewed by existing radiographic film viewing techniques.

Briefly, the present invention comprises a radiographic microfilm projection device including an optical system having a removable prism that permits viewing on a screen at the base of the projection device or on a screen positioned directly in front of the projection device. The viewing screen at the base of the device is easily viewed by operating personnel on a continuous daily basis and is made of a high optical plastic having unique viewing characteristics. Spaced immediately behind this base screen are controls which the operator can use to control the projector. These controls consist of a light control which will vary the light intensity of the projection device to compensate for the variation in densities of the microfilm of from between 0.6 to about 0.9. The controls also include switches for the forward and reverse motors and a forward motor speed control for varying the viewing rate of the microfilm as it passes across the high optical plastic screen. The optical system includes radiographic tint simulator for tinting the projected microfilm to simulate the actual radiographs. The projection device also includes motor driven film contaminant remover.

Other objects, advantages and novel features of the invention will become apparent from the following detailed description of the invention when considered in conjunction with the accompanying drawings wherein.

Figure 1:
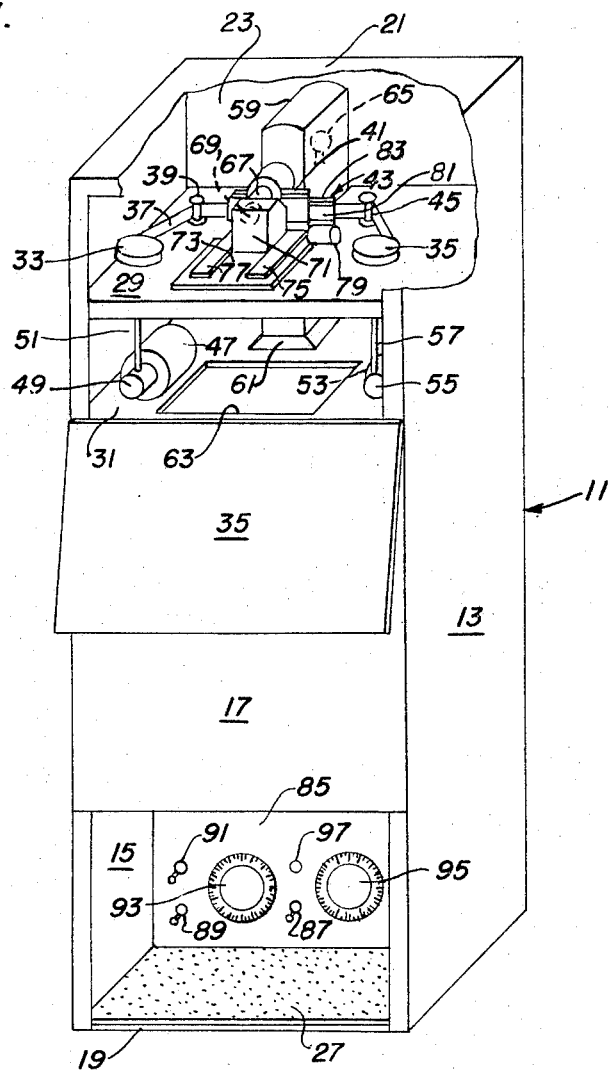
FIG. 1 is a pictorial view of the radiographic microfilm projection device of the present invention.

In FIG. 1 the radiographic microfilm projection device is generally referred to by reference numeral 11. The projection device includes side panels 13 and 15, front panel 17, base 19, top 21, and back 23. Front panel 17 includes front cover 25 for covering the front opening through which access to the projection equipment is attainable. The front panel also includes an opening at its lower region. Through this opening the projection device operator may view high optical plastic screen 27 and manipulate the electrical controls. The upper region of enclosure 11 includes upper base plate 29 and lower base plate 31. Rotatably mounted on upper base plate 29 are storage reel 33 and take up reel 35. The film 37, which is removed from storage reel 33, sequentially passes over film guide roller 39, through film guide 41, between film contaminant remover 43, over film guide roller 45 and onto take up reel 35. Storage reel 33 is driven by reverse motor 47 through speed reduction mechanism 49 and drive shaft 51. Take up reel 35 is driven by forward motor 53 through speed reduction mechanism 55 and drive shaft 57. Base 61 of projector 59 and motors 47 and 53 are directly mounted on lower base plate 31. Base plate 31 also includes a projection opening 63 through which the light emanating from the projector passes.

Figure 3:
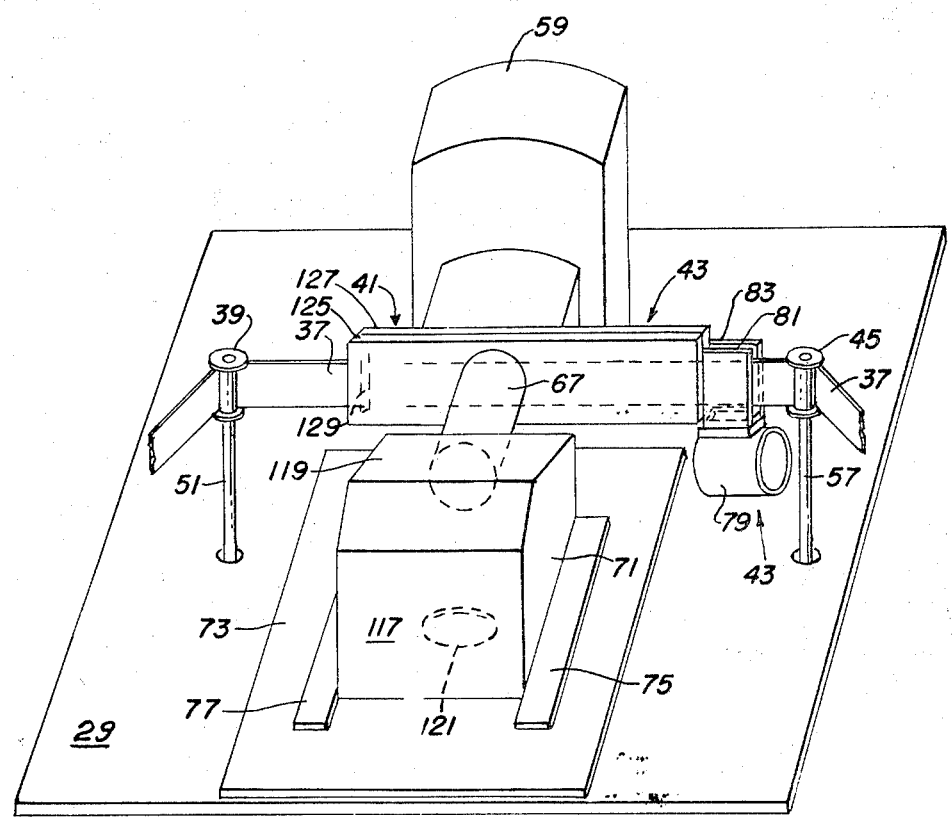
FIG. 3 is an enlarged view of the optical system, the film guide and film contaminant remover of the radiographic microfilm projection device of FIG. 1.

The light from light source 65, illustrated in dotted lines, of projector 59 passes through projector lens 67 and through radiographic tint simulator 69 into prism 71, which deflects the light downwards through opening 121 of FIG. 3 in upper base plate 29, and downwards through projection opening 63 and onto the surface of high optical plastic screen 27. Mounted directly over opening 121 of upper base plate 29 is radiographic tint simulator 73. Mounted on tint simulator 73 are a pair of spaced apart prism guides 75 and 77 upon which prism 71 is slidably mounted. Film contaminant remover 43 includes a motor and fan mechanism 79 which are mounted on upper base plate 29. Directly mounted on the motor and fan mechanism 79 are a pair of spaced apart upstanding air guides 81 and 83 between which the air from the fan passes and also between which passes film 37 as it is being moved in either the forward or reverse directions. The film contaminant remover 43 is important for film preservation and for preventing contaminants from being on the film while it is being viewed on high optical plastic screen 27. This is particularly important since these contaminants could very easily be taken as imperfections contained in the material that was radiographed. Prism 71 is made slidable on prism guide 75 since it is then removable from the system. When the prism is removed from the system the light will project outwards rather than downwards. When the light is projected outward then it may be viewed on a screen positioned in front of the projector to provide an alternative method of viewing which is quite useful when it is desirable to simultaneously show the projected microfilmed radiograph to several individuals. When the prism is removed the projected light is tinted by radiographic tint simulator 69. When the microfilm is to be viewed on screen 27 radiographic tint simulator 69 is preferably removed and prism 71 is put into place and light then passes downwards through the prism, through radiographic tint simulator 73 and onto the surface of screen 27. Radiographic tint simulators 69 and 73 are made of optical material having a blue tint, such as glass or plastic, which simulates the blue tone background of the radiographic film.

Mounted on electrical panel 85 are the operating controls for the radiographic microfilm projection device of the present invention. These controls include power switch 87, forward motor switch 89, reverse motor switch 91, forward motor speed control 93, light intensity control 95 and indicator light 97. It should be particularly noted that these control elements are spaced directly in front of the operator who is viewing the film as it passes across plastic screen 27 and therefore any necessary modifications of the projected light or speed of film may very easily be achieved by manipulating any of these particular controls.

Figure 2:
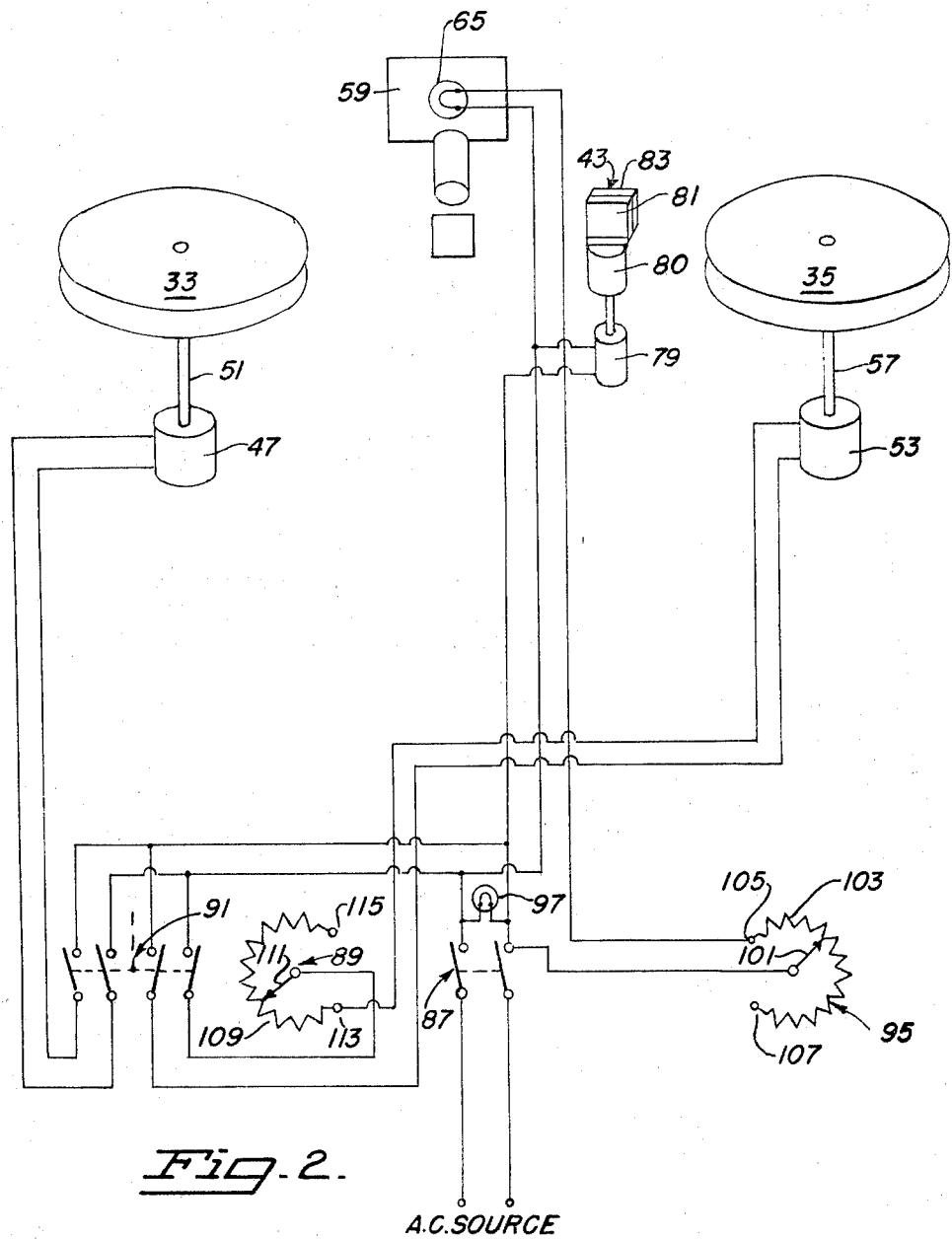
FIG. 2 is a schematic diagram of the electrical circuit of the radiographic projection device shown in FIG. 1.

In FIG. 2 is schematically illustrated the electrical circuit used for controlling the projection device of FIG. 1 in accordance with the present invention. AC power is applied to main power switch 87, the output terminals of which are connected to indicator light 97 and light intensity control 95 which may be a conventional rheostat having a resistance selector arm 101 and a resistor 103 upon which the arm travels. Resistance 103 is in series with light source 65 of projector 59. When arm 101 is adjacent terminal 105 then minimum series resistance will be present and the light source will have maximum intensity and when arm 103 is adjacent terminal 107 then maximum series resistance will be present and the output from light source 65 will be at a minimum.

The light intensity is selected such that the viewed projected light will be at an optimum level. That is, the density range of the microfilm will normally vary from between about 0.6 to about 0.9 with the optimum density at about 0.85. A predetermined light output from light source 65 will result in an optimum projected image for microfilm having a density of 0.85. According to the present invention to maintain nearly this same optimum projected image with microfilm having densities above and below the 0.85 value the light output of light source 65 is increased and decreased, respectively, from the predetermined light output for the 0.85 density microfilm. This projected light may be selectively manipulated by the operator viewing the film by actuating light intensity control 65 as described.

When main power switch 87 is actuated, the motor 80 of motor and fan mechanism 79 will be actuated which will operate fan 81 thereby causing air to pass between guides 81 and 83 of film contaminant remover 43. The speed of operation of motor 80 is preferably held constant for all conditions of operation.

In addition, when main power switch 87 is actuated, power is available to forward motor switch 89 and reverse motor switch 91. When forward motor switch 89 is closed then power is applied to forward motor 53 through forward motor speed control 89 which includes resistor 109 and resistance selector arm 111. When arm 111 is adjacent terminal 113 minimum resistance is in series with forward motor 53 and forward motor 53 will then operate at maximum speed. When arm 111 is adjacent terminal 115 maximum resistance is employed and forward motor 53 will then operate at minimum speed. Therefore, the operator, by manipulating forward motor speed control 93 may control the forward motor speed to easily and accurately control the speed of the microfilm projection. When reverse motor switch 91 is actuated, it causes power to be applied to reverse motor 47 to wind the microfilm on storage reel 33. Preferably reverse motor switch 91 and forward motor switch 89 are gang connected so that only one of the switches may be operated at any one time. That is, when forward motor switch 89 is closed it will cause reverse motor switch 91 to open and, conversely, when reverse motor switch 91 is closed it will cause forward motor switch 89 to open. It should be noted that an intermediate position of the gang switch results in both of switches 89 and 91 being open as illustrated in FIG. 2.

In FIG. 3 is illustrated an enlarged view of the projection equipment section of the projection device of FIG. 1. Mounted on lower base plate 31 is radiographic tint simulator plate 73 which comprises blue glass having a sufficient blue tint so as to simulate the blue background characteristics of the actual radiographic film when viewed. Mounted on radiographic tint simulator plate 73 are a pair of parallel spaced apart prism guides 75 and 77. Prism 77 is mounted on these parallel guides so that it may be moved outwards and removed from the optical system. When the prism is in place the light path is through projector lens 67 against surface 117 and then reflected against surface 119 and then reflected downwards through opening 121, shown in dotted lines, of base plate 29. Film 37 passes over film guide rollers 39 and 45 which are rotably mounted on shafts 51 and 57 that respectively pass through openings 122 and 124 in base plate 29. Between rollers 39 and 45 are film guide 41 and film contaminant remover 43. Film contaminant remover 43 includes rectangular air guides 81 and 83 that are mounted on base 121 which has an aperture 123 through which air from motor and fan mechanism 79 passes upwards and through the space formed between air guides 81 and 83. This upward moving air steam passes over both surfaces of film 37 thereby removing all contaminants that may have collected on the film.

Film guide 41 includes a pair of rectangular coextensive members 125 and 127 which are in facial contact wherein each of these members has an internal groove which extends throughout its entire length thereby forming an opening 129, illustrated in dotted lines, that extends throughout the length of the film guide 41 and through which film 37 passes. It has been found particularly desirable to form member 125 from Teflon. Member 127 may be formed from plastic or other light transmitting material. The width of slot 129, through which the film passes, is preferably about 1/16 inch and the edge clearances of the film from the slot is preferably only several thousands of an inch. Film guide 41 is positioned such that the outside surface of film 37 slightly presses against the Teflon surface of the groove formed in member 125. In this manner the film is very accurately positioned to maintain proper focus. Teflon has been found to be extremely satisfactory for this purpose since it provides a very smooth surface over which the film may pass and thereby prevent injury to the film by scratching or the like.

Obviously many modifications and variations of the present invention are possible in the light of the above teachings. It is therefore to be understood that within the scope of the appended claims the invention may be practiced otherwise than as specifically described.

What is claimed is:

1. A radiographic microfilm projection device comprising:
   (a) a projector having a light source;
   (b) means for feeding rolled film to said projector;
   (c) speed control for varying the speed of said rolled film;
   (d) light control means for varying the light intensity of said light source to provide for optimum viewing of said film by varying the light intensity of said light source to compensate for the density variation of said film and thereby provide optimum viewing of the projected film;
   (e) a radiographic tint simulator for modifying the light transmitted from said projection device to simulate actual radiographs;
   (f) said radiographic tint simulator comprises light transmitting material having a blue tint; and
   (g) a film contaminant remover adjacent said projector and said film for removing contaminants from said film as it passes from said projector.

2. The radiographic projection device of claim 1 wherein:
   (a) said film contaminant remover includes a pair of spaced apart upstanding air guides between which said film passes; and
   (b) means for causing a flow of air to pass between said air guides and over both surfaces of said film.

3. A radiographic microfilm projection device comprising:
   (a) a projector having a light source;
   (b) means for feeding rolled film to said projector;
   (c) speed control for varying the speed of said rolled film;
   (d) light control means for varying the light intensity of said light source to provide for optimum viewing of said film by varying the light intensity of said light source to compensate for the density variation of said film and thereby provide optimum viewing of the projected film;
   (e) high optical plastic projection screen positioned at the base of said projection device;
   (f) said projector being positioned above said screen;
   (g) optical means for causing the light from said projector to be projected on said screen;
   (h) said optical device comprising a prism that reflects said projected light at a 90° angle through an opening in said projection device.
   (i) said projection device mounted in a frame comprising a plurality of panels; and
   (j) an opening provided in the front panel for directly viewing said screen.

4. The radiographic projection device of claim 3 wherein:
   (a) said speed control means and said light control means are mounted on said projection device on a panel directly behind said projection screen.

5. The radiographic projection device of claim 3 wherein:
   (a) said prism is slidably mounted on said radiographic tint simulator whereby when said prism is removed the light from said projector is transmitted outward from said radiographic projection device.

References Cited

UNITED STATES PATENTS

| | | |
|---|---|---|
| 947,490 | 1/1910 | Gwozdz. |
| 2,213,212 | 9/1940 | Foster et al. _____ 352—198 XR |
| 2,691,320 | 10/1954 | Borberg _____ 352—198 |
| 2,762,256 | 9/1956 | Gottschalk. |
| 2,822,729 | 2/1958 | Capatosto. |
| 3,198,065 | 8/1965 | Bohm _____ 352—41 XR |
| 3,302,516 | 2/1967 | Stapsy. |
| 3,338,132 | 8/1967 | Ruhle et al. _____ 352—202 XR |

FOREIGN PATENTS

| | | |
|---|---|---|
| 1,152,559 | 9/1957 | France. |

NORTON ANSHER, Primary Examiner

ROBERT P. GREINER, Assistant Examiner

U.S. Cl. X.R.

353—77, 98